(No Model.)
W. C. PRICE.
MAT.
No. 443,331.                    Patented Dec. 23, 1890.
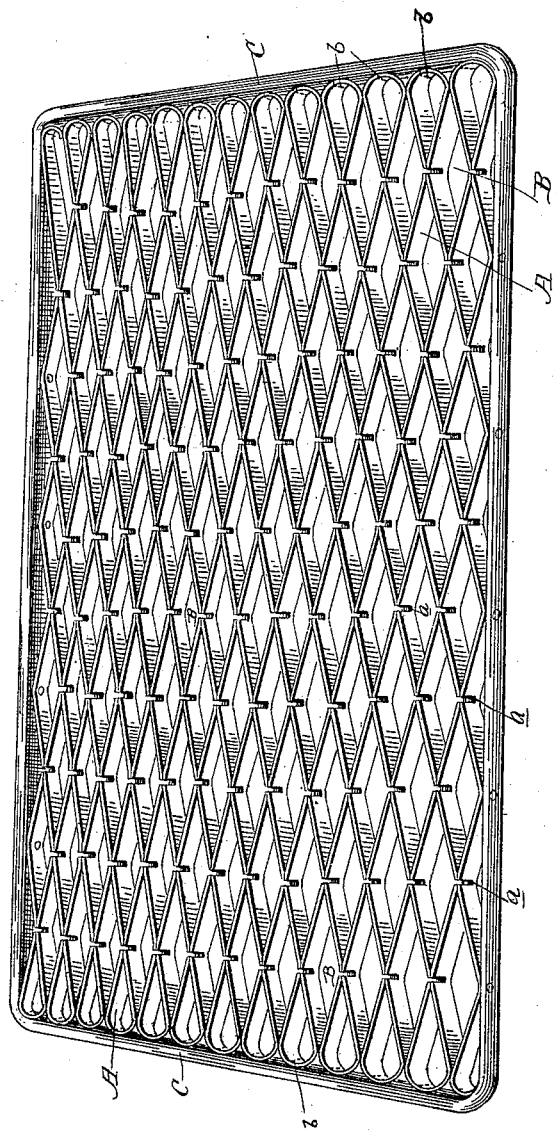
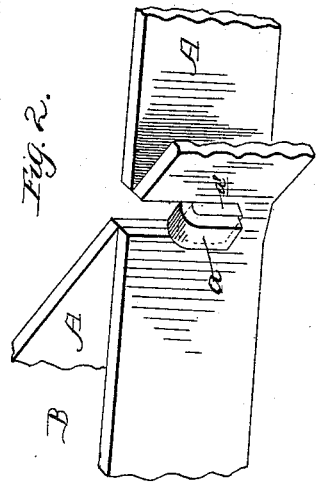
WITNESSES
INVENTOR
W. C. Price
By Donald C. Ridout & Co
Attorneys.

UNITED STATES PATENT OFFICE.

WILLIAM C. PRICE, OF TORONTO, ONTARIO, CANADA, ASSIGNOR, BY DIRECT AND MESNE ASSIGNMENTS, TO HENRY BEISHEIM, OF ROCHESTER, NEW YORK.

MAT.

SPECIFICATION forming part of Letters Patent No. 443,331, dated December 23, 1890.

Application filed August 6, 1888. Serial No. 282,097. (No model.)

*To all whom it may concern:*

Be it known that I, WILLIAM CHARLES PRICE, gentleman, of the city of Toronto, in the county of York, in the Province of Ontario, Canada, have invented a certain new and Improved Mat, of which the following is a specification.

This invention relates to certain new and useful improvements in mats of that class formed of a bar or bars set on edge and bent zigzag, so as to form a series of substantially diamond-shaped openings; and the invention consists in the novel means of securing the bars together at their points of contact, all as hereinafter more fully described and claimed.

Although I prefer to make my mat of light steel, I may state before describing its construction that I do not wish nor do I intend to confine myself to any particular metal. Nor do I wish to confine myself to the exact shape of the diamond-shaped openings shown.

Figure 1 is a perspective view of my improved mat. Fig. 2 is an enlarged detail view of two bars or portions of a single bar bent upon itself secured in accordance with my invention.

In the drawings I have shown a mat formed of a series of strips or bars A, bent or corrugated, as shown, and arranged within a frame C, with the apices of the corrugations abutting, said corrugations in the present construction being angular, so that a series of diamond-shaped apertures B will be formed. The strips or bars A in the present construction are composed of a single piece of metal, preferably steel, corrugated and bent upon itself at $b$; but it will be understood that the single separate strips could as well be used.

To secure rigidity in the mat and fasten the strips together, I secure the bars or strips at the projecting parts of the corrugations to each other in the following manner:

In each bar or portion of the bar at the apex of the corrugation I form a tongue and bend the tongues of the adjacent strips down on one side, the tongue on one bar projecting over that on the other, which latter lies close to its strips or bars, as shown in the drawings. This forms a secure means of holding the bars together and admits of their being readily detached and put together. These tongues are designated by the letters $a$ $a'$.

So far as the securing of the bars is concerned, it is immaterial whether the mats be formed of a single bar or of a plurality of bars. Therefore where in the claims I refer to the term "bars" or "strips" I wish it to be understood as covering either two members of a single bar bent upon itself or a plurality of bars, the adjacent portions of the single bar forming in reality bars.

The shape of the corrugations in the bars or strips may of course be varied without departing from the spirit of my invention, as instead of making them angular, as shown, they could as well be rounded at their apices.

It will be noticed, also, that by cutting the tongues $a$ $a'$ from the edge of the bars the said tongues can be easily formed and the strips fastened together, even after the strips are placed with the corrugations abutting in position to form the mat, the tongue of one strip overlapping that on the adjacent one, by the bending down of which the recess for the accommodation of the overlapping tongue is formed.

I claim as my invention—

1. A mat consisting of corrugated metal strips or bars arranged with their corrugations abutting and having tongues formed by cutting down from one edge, the tongues on said bars projecting over and engaging corresponding recesses formed in the edges of the adjacent bars, substantially as described.

2. A mat consisting of corrugated metal strips or bars arranged with their corrugations abutting and having tongues formed by cutting down from one edge, the tongues on adjacent bars being bent down in the same direction, whereby one tongue will overlap the other and bind the parts together, substantially as described.

Toronto, July 20, 1888.

WILLIAM C. PRICE.

In presence of—
CHARLES C. BALDWIN,
J. M. JACKSON.